United States Patent
Cheng et al.

(10) Patent No.: US 8,928,598 B2
(45) Date of Patent: Jan. 6, 2015

(54) TOUCH-SENSING LIQUID CRYSTAL DISPLAY PANEL AND LIQUID CRYSTAL DISPLAY

(75) Inventors: Tsung-Chin Cheng, Kaohsiung (TW); Hong-Ji Huang, Hsinchu (TW); Yue-Hung Wu, Chiayi (TW); Zeng-De Chen, Yunlin County (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 773 days.

(21) Appl. No.: 12/789,464

(22) Filed: May 28, 2010

(65) Prior Publication Data

US 2010/0315362 A1    Dec. 16, 2010

(30) Foreign Application Priority Data

Jun. 12, 2009 (TW) .............................. 98119726 A

(51) Int. Cl.
| | |
|---|---|
| *G06F 3/041* | (2006.01) |
| *G06F 3/045* | (2006.01) |
| *G02F 1/1333* | (2006.01) |
| *G02F 1/1339* | (2006.01) |
| *G02F 1/1362* | (2006.01) |

(52) U.S. Cl.
CPC .............. *G06F 3/045* (2013.01); *G06F 3/0412* (2013.01); *G02F 1/13338* (2013.01); *G02F 1/13394* (2013.01); *G02F 2001/136218* (2013.01)
USPC .......................................... 345/173; 349/143

(58) Field of Classification Search
CPC ..... G06F 3/018; G06F 3/0488; G06F 3/0238; G06F 3/0418; G02F 1/136286; G02F 1/134336; G02F 1/133334
USPC ............. 345/156, 173–178; 349/56, 139, 143
See application file for complete search history.

(56) References Cited

U.S. PATENT DOCUMENTS 5,751,381 A * 5/1998 Ono et al. ....................... 399/46
6,433,852 B1 8/2002 Sonoda et al.
(Continued)

FOREIGN PATENT DOCUMENTS

| CN | 101038385 | 9/2007 |
|---|---|---|
| CN | 201107503 | 8/2008 |
| TW | 535025 | 6/2003 |

OTHER PUBLICATIONS

"Office Action of Taiwan counterpart application" issued on Dec. 19, 2012, p. 1-p. 10.

(Continued)

*Primary Examiner* — Christopher E Leiby
(74) *Attorney, Agent, or Firm* — Jianq Chyun IP Office

(57) ABSTRACT

A touch-sensing liquid crystal display (LCD) panel including an active device array substrate, an opposite substrate, and a liquid crystal layer disposed therebetween is provided. The active device array substrate includes a first substrate, a pixel array, a plurality of touch-sensing pads, and an electric field shielding layer. The pixel array is disposed on the first substrate and includes a plurality of sub-pixels arranged in an array, a plurality of scan lines, and a plurality of data lines. The touch-sensing pads are disposed on the first substrate. The electric field shielding layer is disposed on the pixel array and arranged between sub-pixels adjacent to each other, and the electric field shielding layer includes a pattern. The opposite substrate includes a common electrode and a plurality of touch-sensing protrusions disposed above the touch-sensing pads. Therefore, when the touch-sensing LCD panel is pressed, press mura is substantially eliminated.

24 Claims, 15 Drawing Sheets

(56) References Cited

U.S. PATENT DOCUMENTS

| | | |
|---|---|---|
| 6,954,250 B2 | 10/2005 | Kuroha |
| 7,420,533 B2 | 9/2008 | Yun |
| 7,449,347 B2 | 11/2008 | Lai |
| 7,936,428 B2 * | 5/2011 | Takahashi et al. ............ 349/141 |
| 8,307,549 B2 * | 11/2012 | Caldwell et al. ................ 29/847 |
| 2002/0159016 A1 * | 10/2002 | Nishida et al. ................ 349/141 |
| 2004/0027525 A1 * | 2/2004 | Itakura et al. ................. 349/141 |
| 2004/0239650 A1 * | 12/2004 | Mackey ........................ 345/174 |
| 2006/0146034 A1 * | 7/2006 | Chen et al. .................... 345/173 |
| 2007/0062739 A1 * | 3/2007 | Philipp et al. .............. 178/18.06 |
| 2008/0106658 A1 * | 5/2008 | Wang et al. ..................... 349/37 |
| 2008/0186434 A1 * | 8/2008 | Yun et al. ...................... 349/106 |
| 2008/0309627 A1 * | 12/2008 | Hotelling et al. ............. 345/173 |
| 2010/0085497 A1 * | 4/2010 | Chang ............................. 349/37 |
| 2011/0050585 A1 * | 3/2011 | Hotelling et al. ............. 345/173 |

OTHER PUBLICATIONS

"1st Office Action of China counterpart application", issued on May 31, 2010, p. 1-p. 4.

\* cited by examiner

TOUCH-SENSING LIQUID CRYSTAL DISPLAY PANEL AND LIQUID CRYSTAL DISPLAY

CROSS-REFERENCE TO RELATED APPLICATION

This application claims the priority benefit of Taiwan application serial no. 98119726, filed on Jun. 12, 2009. The entirety of the above-mentioned patent application is hereby incorporated by reference herein and made a part of specification.

BACKGROUND OF THE INVENTION

1. Field of Invention

The present invention generally relates to a display panel, and more particularly, to a touch-sensing liquid crystal display (LCD) panel.

2. Description of Related Art

In today's information age, people are becoming more and more reliant on electronic devices. Electronic products such as notebook computers, mobile phones, personal digital assistants (PDAs), and digital walkmans are becoming indispensable in people's day-to-day life and work. The above-mentioned electronic products are all installed with a human-machine interface, and each is equipped with an internal system that automatically executes the command inputted by a user. Currently, some of the most widely used human-machine interfaces include keyboards, mice, and touch panels.

Recently, touch-sensing LCD panels have been widely applied in a variety of electronic products, such as global positioning systems (GPS), PDAs, mobile phones, hand-held PCs, and the like in order to replace the traditional input devices (e.g., keyboards and mice). With such drastic design changes, electronic devices have become more user-friendly, not to mention the space saved through eliminating the traditional input devices and the ease of data browsing afforded by larger display panels.

Currently, the touch-sensing LCD panel can be generally categorized into a resistive touch-sensing LCD panel and a capacitive touch-sensing LCD panel based on its driving manner and structural design. A resistive touch-sensing LCD panel is formed by a flexible top substrate, a rigid bottom substrate, and an insulating spacer. The inside surfaces of the top substrate and the bottom substrate are coated with transparent indium tin oxide films (ITO films) in order to form an upper resistive layer and a lower resistive layer.

When a finger or an object is pressed against the top substrate having the upper resistive layer, the upper resistive layer and the lower resistive layer forced in contact. When the upper and lower resistive layers are electrically connected, a voltage generated by a control unit on the upper resistive layer can be read from the lower resistive layer. The X and Y coordinates of the press position can be determined by the size of voltages at the upper and lower resistive layers which are detected by the control unit.

FIGS. 1A and 1B are respective schematic views of a conventional resistive touch-sensing LCD panel before and after touch by a user. The left-hand side of FIGS. 1A and 1B are respective frontal views of the conventional touch-sensing LCD panel, while on the right-hand side of FIGS. 1A and 1B are cross-sectional schematic views along an A-A' line of the touch-sensing LCD panel on the left-hand side of the figures. As shown in FIG. 1A, a touch-sensing LCD panel 100 includes a bottom substrate 110, a top substrate 120, and a liquid crystal layer 130 disposed therebetween.

As shown in FIG. 1B, when the user touches the touch-sensing LCD panel 100 with a finger or an object, a cell gap between the bottom substrate 110 and the top substrate 120 is forced smaller upon application of the external pressure, thereby stressing the liquid crystal molecules of the touch area in liquid crystal layer 130. Consequently, the original alignment orientation of the liquid crystal molecules in the touch area is changed, and light leakage L is occurred.

As shown in area M depicted in FIG. 1C, when the external pressure is unavailable, a press mura can still be seen on the touch-sensing LCD panel 100. In other words, after applying an external pressure on a conventional touch-sensing LCD panel 100, the liquid crystal molecules in the liquid crystal layer 130 are affected by the surrounding distorting electric fields. Hence, the liquid crystal molecules cannot timely return to their original alignment orientation, and consequently, a press mura appears on the touch-sensing LCD panel. Ultimately, the display quality of the LCD panel is substantially deteriorated. Usually, the above-described distorting electric fields can be ascribed to the gate electric field effect from the bottom substrate, or different polarities between adjacent sub-pixels.

SUMMARY OF THE INVENTION

Embodiments of the present invention may provide a touch-sensing LCD panel that substantially eliminates press mura.

Embodiments of the present invention may provide a touch-sensing LCD panel. The touch-sensing LCD panel includes an active device array substrate, an opposite substrate, and a liquid crystal layer. The active device array substrate includes a first substrate, a pixel array, a plurality of touch-pads, and an electric field shielding layer. The pixel array is disposed on the first substrate, and the pixel array includes a plurality of sub-pixels arranged in an array, a plurality of scan lines, and a plurality of data lines. A plurality of touch-sensing pads are disposed on the first substrate. The electric field shielding layer is disposed on the pixel array and arranged between the sub-pixels that are adjacent to each other, and the electric field shielding layer includes a mesh pattern. The opposite substrate includes a common electrode and a plurality of touch-sensing protrusions disposed above the touch-sensing pads. The liquid crystal layer is disposed between the active device array substrate and the opposite substrate.

In one embodiment of the present invention, the aforementioned scan line and data line are intersected to define a plurality of sub-pixel regions, and each of the sub-pixels is respectively disposed in a sub-pixel region. The aforementioned mesh pattern has a plurality of openings, and each of the openings respectively correspond to a sub-pixel region. Alternatively, each of the aforementioned openings can respectively correspond to at least two adjacent sub-pixel regions. In addition, the adjacent sub-pixel regions corresponding to each of the aforementioned openings can have the same polarity.

In one embodiment of the present invention, the mesh pattern of the aforementioned electric field shielding layer divides the pixel array into a plurality of regions, each region including at least one sub-pixel, and sub-pixels in adjacent regions have a different polarity.

Embodiments of the present invention may provide another touch-sensing LCD panel. The touch-sensing LCD panel includes an active device array substrate, an opposite substrate, and a liquid crystal layer. The active device array substrate includes a first substrate, a pixel array, a plurality of touch-pads, and an electric field shielding layer. The pixel array is disposed on the first substrate, and the pixel array includes a plurality of sub-pixels arranged in an array, a plurality of scan lines, and a plurality of data lines. A plurality of touch-sensing pads are disposed on the first substrate. The electric field shielding layer is disposed on the pixel array and arranged between sub-pixels that are adjacent to each other, and the electric field shielding layer includes a plurality of strip patterns. The opposite substrate includes a common electrode and a plurality of touch-sensing protrusions arranged above the touch-sensing pads. The liquid crystal layer is disposed between the active device array substrate and the opposite substrate.

In one embodiment of the present invention, the aforementioned scan lines and data lines are intersected to define a plurality of sub-pixel regions, and each of the sub-pixels can be respectively disposed in a sub-pixel region.

In one embodiment of the present invention, an extending direction of the aforementioned strip patterns can be parallel to an extending direction of the scan lines.

In one embodiment of the present invention, an extending direction of the aforementioned strip patterns can be parallel to an extending direction of the data lines.

In one embodiment of the present invention, sub-pixels disposed between two adjacent strip patterns can have the same polarity.

In one embodiment of the present invention, the mesh pattern of the aforementioned electric field shielding layer divides the pixel array into a plurality of regions, each region including, for example, at least one sub-pixel, and sub-pixels in adjacent regions can have a different polarity.

Embodiments of the present invention may provide an LCD panel. The LCD panel includes an active device array substrate, an opposite substrate, and a liquid crystal layer. The active device array substrate includes a first substrate, a pixel array, and an electric field shielding layer. The pixel array is disposed on the first substrate, and the pixel array includes a plurality of sub-pixels arranged in an array, a plurality of scan lines, and a plurality of data lines. The electric field shielding layer is disposed on the pixel array and arranged between sub-pixels that are adjacent to each other, and the electric field shielding layer includes a pattern. The opposite substrate includes a common electrode. The liquid crystal layer is disposed between the active device array substrate and the opposite substrate.

In one embodiment of the present invention, the aforementioned scan lines and data lines are intersected to define a plurality of sub-pixel regions, and each of the sub-pixels is respectively disposed in a sub-pixel region.

In one embodiment of the present invention, the pattern of the aforementioned electric field shielding layer divides the pixel array into a plurality of regions, each region including at least one sub-pixel, and sub-pixels in adjacent regions have a different polarity.

In one embodiment of the present invention, the pattern of the aforementioned electric field shielding layer includes a mesh pattern. The mesh pattern can have a plurality of openings, and each of the openings respectively correspond to adjacent sub-pixel regions that have the same polarity.

In one embodiment of the present invention, the pattern of the aforementioned electric shielding layer includes a plurality of strip patterns. An extending direction of the strip patterns can be parallel to an extending direction of the scan lines. In addition, sub-pixels disposed between two adjacent strip patterns can have the same polarity.

In one embodiment of the present invention, the aforementioned LCD panel further includes a plurality of touch-pads disposed on the first substrate and a plurality of touch-sensing protrusions disposed above the touch-pads.

In summary, embodiments of the present invention may provide an electric field shielding layer on the pixel array between sub-pixels adjacent to each other, in order to substantially shield liquid crystal molecules from electric field effects between adjacent sub-pixels. Consequently, when the touch-sensing LCD panel or the LCD panel is pressed by an external pressure, liquid crystal molecules return substantially faster to their original alignment orientations. Hence, press mura is prevented from substantially affecting the display quality of the touch-sensing LCD panel.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
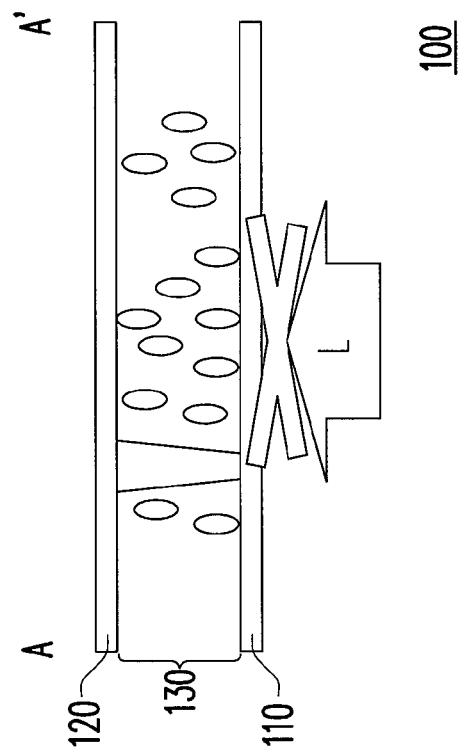
FIGS. 1A and 1B are respective front views and cross-sectional schematic views of a conventional resistive touch-sensing LCD panel before and after touch by a user.
Figure 1A:
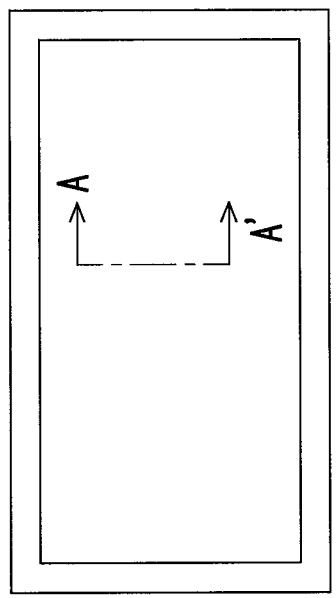
Figure 1B:
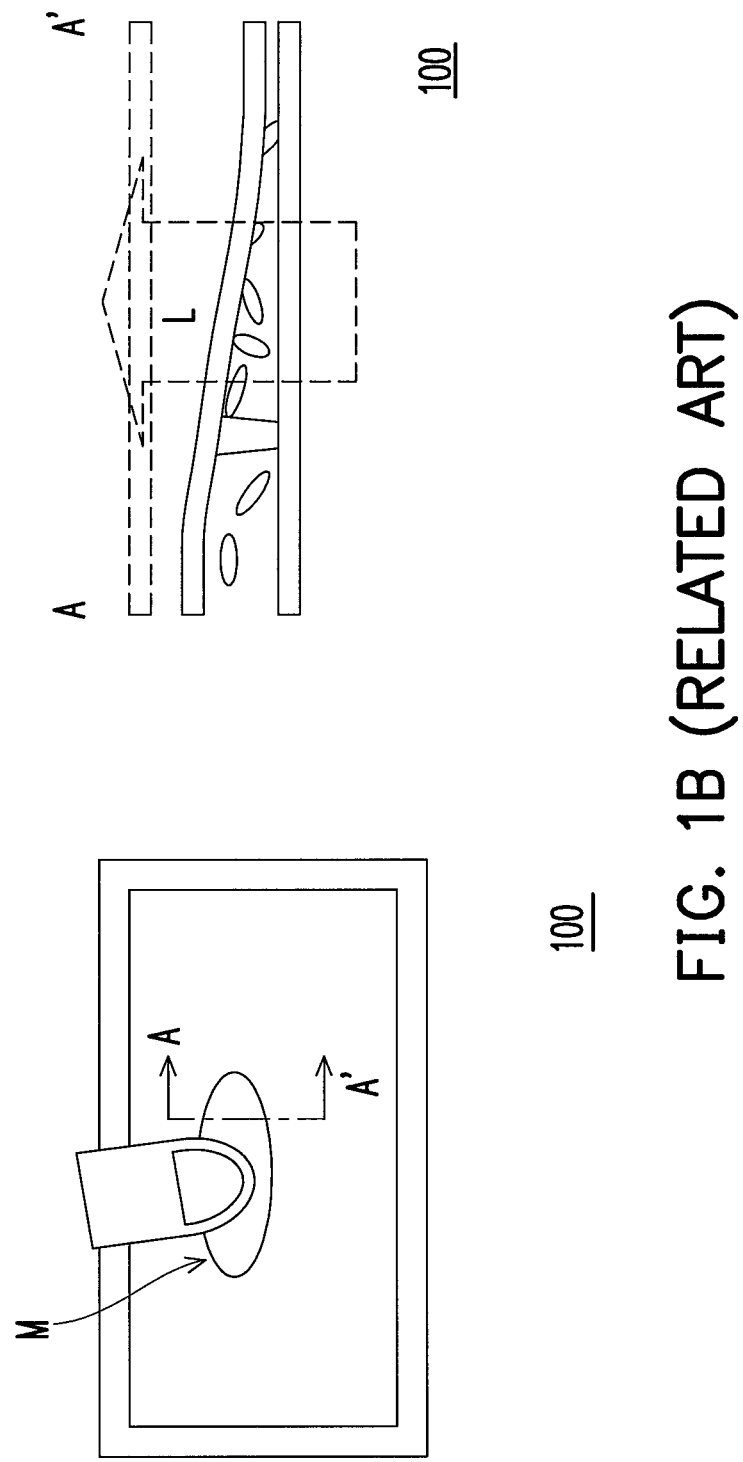
Figure 1C:
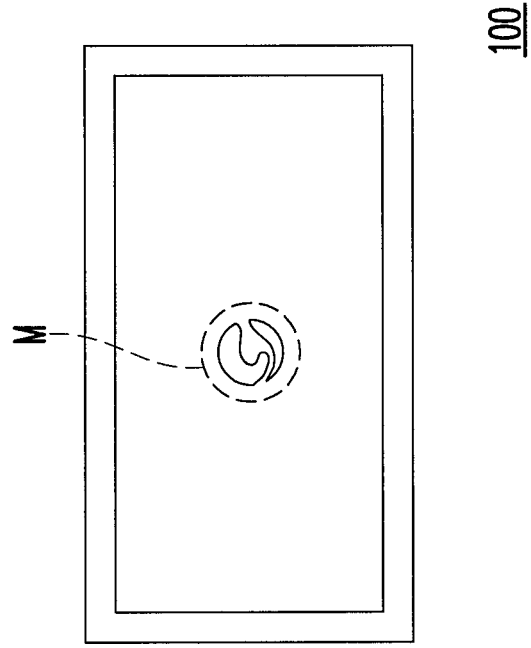
FIG. 1C is a schematic view of a press mura when the conventional touch-sensing LCD panel is pressed.
Figure 2A:
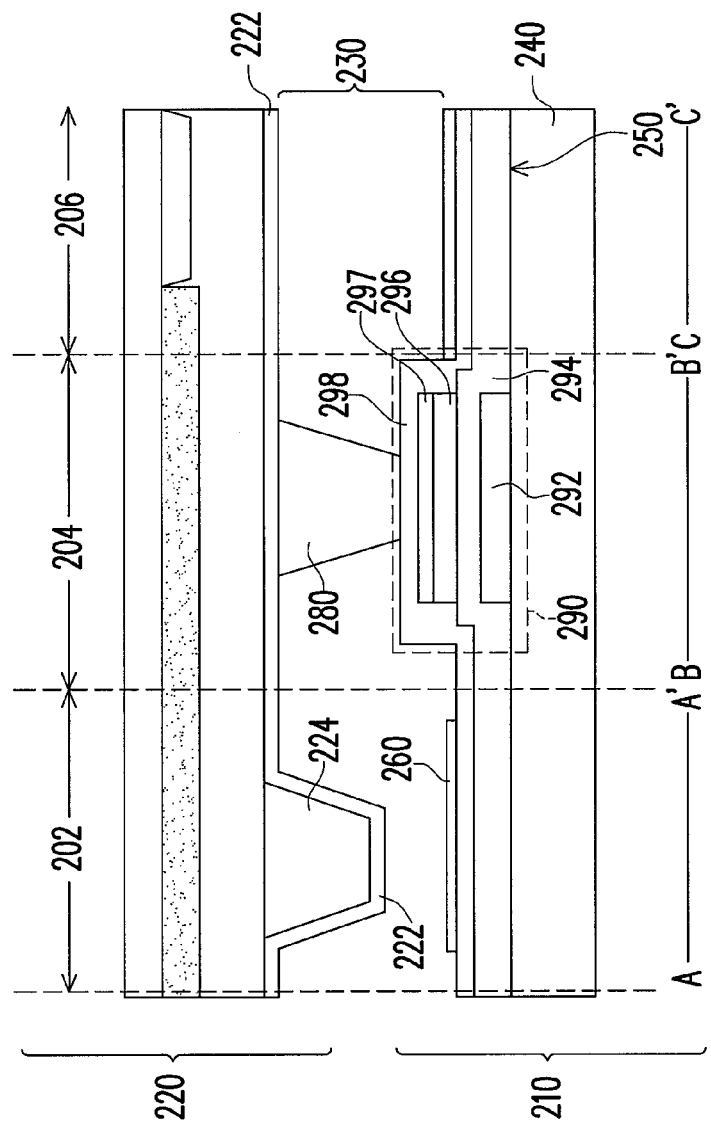
FIG. 2A is a partial magnified cross-sectional schematic view of a touch-sensing LCD panel in accordance with a first embodiment of the present invention.
Figure 2B:
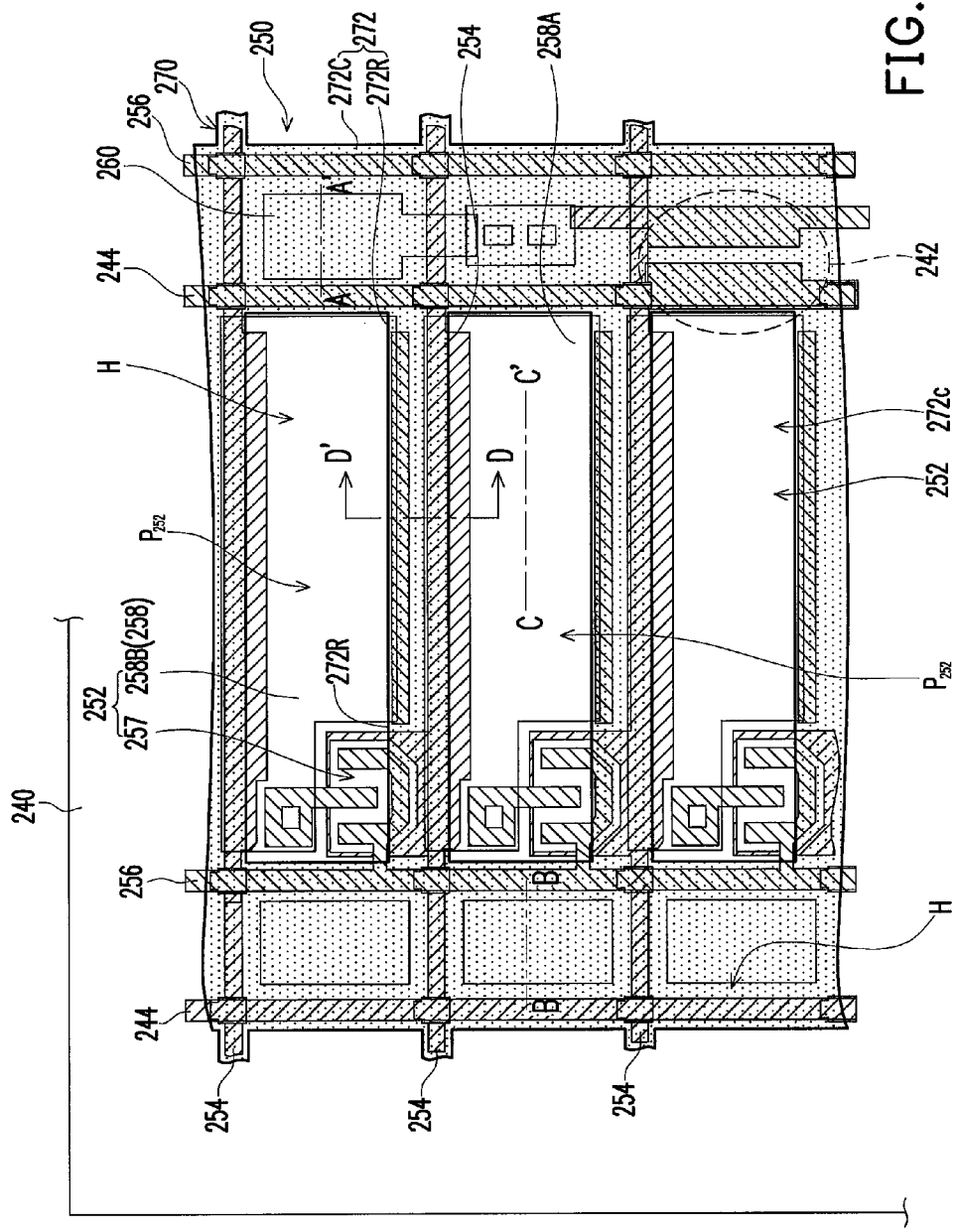
FIG. 2B is a partial top schematic view of an active device array substrate depicted in FIG. 2A.

FIG. 2A and FIG. 2B are respective a partial magnified cross-sectional schematic view and a top view of a touch-sensing LCD panel in accordance with a first embodiment of the present invention. Referring to FIG. 2A, the touch-sensing LCD panel 200 includes an active device array substrate 210, an opposite substrate 220, and the liquid crystal layer 230. The touch-sensing LCD panel 200 includes a touch-sensing region 202, a spacer region 204, and a display region 206. In the present embodiment of the invention, a touch-sensing device is integrated in a sub-pixel 252 of the active device array substrate 210 so that the touch-sensing LCD panel 200 can satisfy the end-users' needs for a product that is both lightweight and thin. As shown in FIG. 2A, the opposite substrate 220 includes a common electrode 222, and the liquid crystal layer 230 is disposed between the active device array substrate 210 and the opposite substrate 220.

Referring to FIGS. 2A and 2B, within the spacer region 204, the touch-sensing LCD panel 200 includes a spacer 280 used to support a cell gap between the active device array substrate 210 and the opposite substrate 220. A padding layer 290 that is used as a submount for the spacer 280 is disposed on the active device array substrate 210 corresponding to the spacer 280. As shown in FIG. 2A, the padding layer 290 includes a first conducting layer 292, a gate insulating layer 294, a channel layer 296, a second conducting layer 297, and a passivation layer 298. A plurality of touch-sensing pads 260 are disposed on the first substrate 240, and the spacer 280 is sandwiched between the common electrode 222 and the passivation layer 298. Furthermore, in the touch-sensing region 202, a plurality of touch-sensing pads 260 are disposed on the first substrate 240, and a plurality of touch-sensing protrusions 224 are arranged above the touch-sensing pads 260. In the touch-sensing region 202, the common electrode 222 is disposed between the touch-sensing protrusions 224 and the touch-sensing pad 260.

FIG. 2B is a partial top schematic view of the active device array substrate depicted in FIG. 2A. The touch-sensing region 202, the spacer region 204, and the display region 206 depicted in FIG. 2A correspond respectively to cross-sectional schematic views along the A-A', B-B', and C-C' lines of FIG. 2B. The liquid crystal layer 230 and the opposite substrate 202 are not shown in FIG. 2B. Referring to FIGS. 2A and 2B, the active device array substrate 210 includes the first substrate 240, the pixel array 250, a plurality of touch-sensing pads 260, and an electric field shielding layer 270. The pixel array 250 is disposed on the first substrate 240, and the pixel array 250 includes a plurality of sub-pixels 252 arranged in an array, a plurality of scan lines 254, and a plurality of data lines 256. Specifically, the electric field shielding layer 270 is disposed on the pixel array 250 and arranged between sub-pixels 252 that are adjacent to each other. The electric field shielding layer 270 includes a pattern. In the present embodiment of the invention, the electric field shielding layer 270 includes a mesh pattern 272.

Moreover, as shown in FIGS. 2A and 2B, in the present embodiment of the invention, scan lines 254 and data lines 256 are intersected with respect to each other, and such arrangement defines a plurality of sub-pixel regions $P_{252}$. Each of the sub-pixels 252 is respectively disposed in a sub-pixel region $P_{252}$. Each of the sub-pixels 252 includes an active device 257 that is disposed in the display region 206 and a pixel electrode 258 electrically connected to the active device 257. An electric field between the pixel electrode 258 and the common electrode 222 controls liquid crystal molecules in the liquid crystal layer 230 so that alignment changes for the liquid crystal molecules generates display effects. In addition, the active device array substrate 210 further includes a sensing active device 242 that is disposed in the touch-sensing region 202, and a touch signal transmit line 244 that is electrically connected to the touch-pads 260 and the sensing active device 242.

It is worth noting that in the present embodiment of the invention, the mesh pattern 272 includes a plurality of openings H. Each of the openings H can respectively correspond to one of the sub-pixels 252. In particular, as shown in FIG. 2B, the mesh pattern 272 includes a row pattern 272R along an extending direction of scan lines 254, and a column pattern 272C along an extending direction of the data lines 256. The row pattern 272R and the column pattern 272C are intersected to define a plurality of openings H. In the present embodiment of the invention, the openings H respectively expose the pixel electrode 258 in each of the sub-pixels 252. Description of the mesh pattern 272 layout is detailed below.

Figure 3:
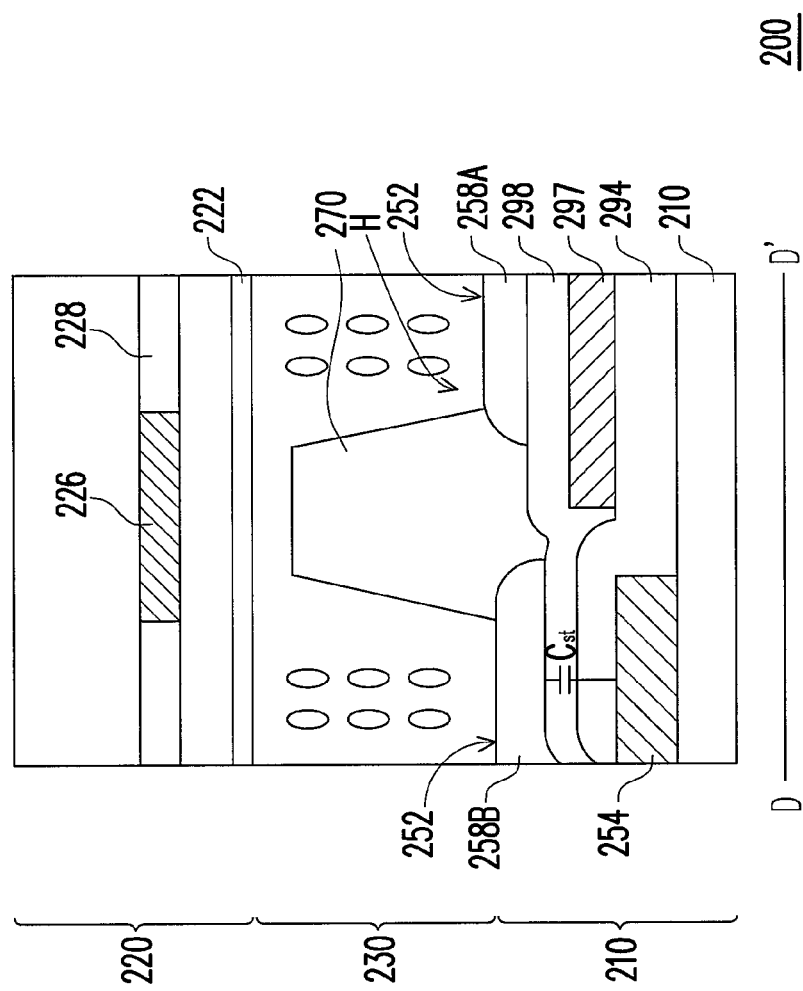
FIG. 3 is a cross-sectional schematic view along a D-D' line depicted in FIG. 2B.

FIG. 3 is a cross-sectional schematic view along a D-D' line depicted in FIG. 2B; FIG. 3 also illustrates the opposite substrate 220 and the liquid crystal layer 230. Referring to FIGS. 2B and 3, a black matrix 226 corresponding to the electric field shielding layer 270 and a color filter pattern 228 corresponding to the sub-pixels 252 are disposed on the opposite substrate 220. The electric field shielding layer 270 is disposed on the pixel array 250 and arranged between sub-pixels 252 that are adjacent to each other. A material for the electric field shielding layer 270 can be a dielectric material, for example.

More specifically, as shown in FIGS. 2B and 3, because the pixel electrode 258B stacks on the scan line 254 (when viewed from the top), the pixel electrode 258B, the passivation layer 298, the gate insulating layer 294, and the scan line 254 form a storage capacitor $C_{st}$ that is formed on gate ($C_{st}$ on gate). It is worth noting that in the present embodiment of the invention, the electric field shielding layer 270 is arranged above the scan lines 254 of the storage capacitor formed by each of the sub-pixels 252. The scan lines 254 are electrically connected to the gate terminal of the active device 257, and hence the electric field of the scan lines 254 located underneath the pixel electrode 258B is called a gate electric field. As shown in FIGS. 2B and 3, the electric field shielding layer 270 can substantially shield the liquid crystal molecules above the pixel electrode 258A from gate electric field effects.

On the other hand, since the electric field shielding layer 270 is disposed sub-pixels 252 that are adjacent to each other, liquid crystal molecules are shielded from the electric field effects between the adjacent sub-pixels 252 and the common electrode 222. For instance, due to the electric field shielding layer 270, the alignment orientation of the liquid crystal molecules located above the pixel electrode 258A does not influence the alignment orientation of the liquid crystal molecules located above the pixel electrode 258B. In short, by using the electric field shielding layer 270, liquid crystal molecules are shielded from the gate electric field effect and the electric field effect between the sub-pixels 252 and the common electrode 222. Therefore, when touch-sensing LCD panel 200 is pressed by an external pressure, the liquid crystal molecules return to their original alignment orientation substantially faster, thereby substeliminating press mura on the touch-sensing LCD panel 200 and substantially improving display quality.

Practically, the electric field shielding layer 270 can be laid out according to a driving scheme of the touch-sensing LCD panel 200. An example below uses the touch-sensing LCD panel 200 depicted in FIG. 2B in conjunction with a type of dot inversion driving scheme to illustrate how the electric field shielding 270 can be laid out on the first substrate. In order to facilitate the description, a plurality of '+' and '−' symbols are used in the figure to depict the relative polarities of the voltage levels of the areas of interest and to determine whether each sub-pixel 252 has positive or negative polarity. A positive polarity is defined when the voltage level of the pixel electrode 258 is substantially higher than the voltage of the common electrode 222. A negative polarity is defined when the voltage level of the pixel electrode 258 is substantially lower than the voltage level of the common electrode 222. However, the present invention is not limited by the embodiment described below.

Figure 4A:
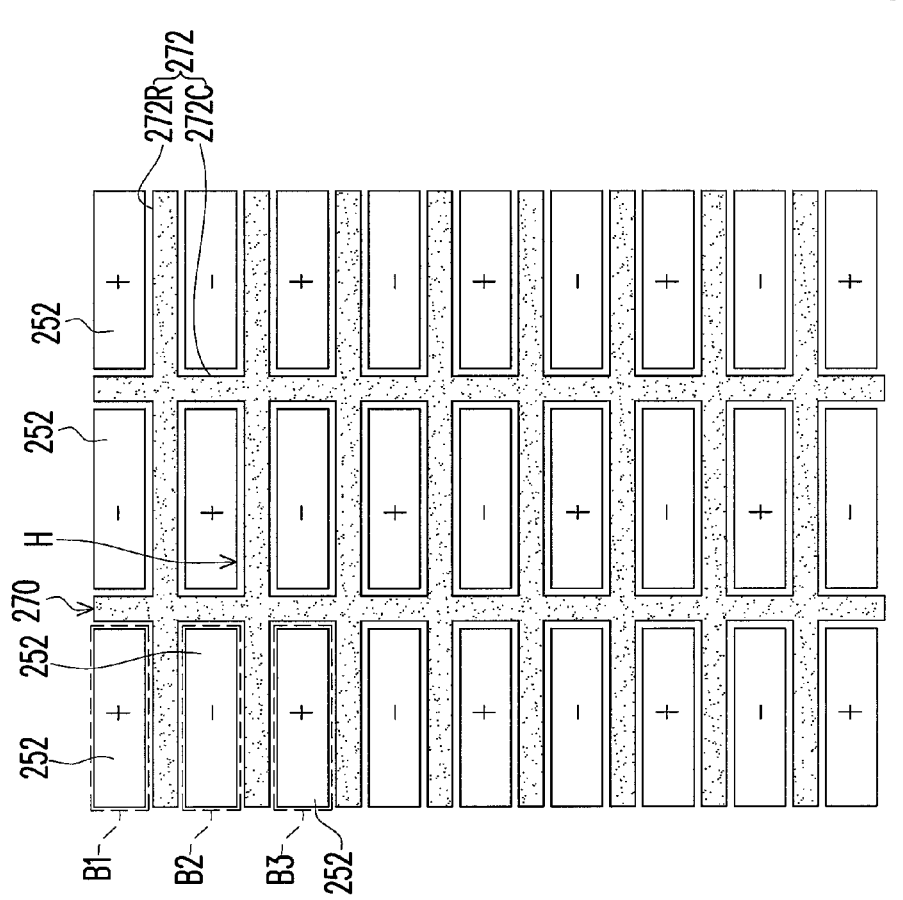
FIG. 4A is a schematic view illustrating a layout of the electric field shielding layer and a signal mode of the touch-sensing LCD panel depicted in FIG. 2B during a frame time.

FIG. 4A is a schematic view illustrating a layout of the electric field shielding layer and a signal mode of the touch-sensing LCD panel depicted in FIG. 2B during a frame time. For clarity of description, the figure only illustrates the positive and negative polarity of the sub-pixels 252 within a frame time and the layout of the electric field shielding layer 270. Other possible components are not shown. Referring to FIG. 4A, sub-pixels 252 adjacent to each other have a different polarity, and the mesh pattern 272 has a plurality of openings H each respectively corresponding to the sub-pixels 252, wherein the mesh pattern 272 including the above-mentioned row pattern 272R and the above-mentioned column pattern 272C. As shown in FIG. 4A, the electric field shielding layer 270 divides the pixel array 250 into a plurality of regions, for instance regions B1, B2, and B3 as depicted in FIG. 4A. In the present embodiment of the invention, each of the regions B1, B2, and B3 respectively includes one of the sub-pixels 252, and the polarity of sub-pixels 252 in each region is different compared to the polarity of the sub-pixels 252 of adjacent regions B1, B2, and B3. In other words, cross talk occurred between adjacent sub-pixels 252 having a different polarity is shielded by the electric field shielding layer 270. Consequently, the corresponding sub-pixels 252 having a different polarity in the liquid crystal layer 230 do not affect each other, thereby substantially decreasing press mura.

It should be noted that a designer may be swayed by other design considerations when designing the electric field shielding layer, such as aperture ratio, product demand, and driving method. Several layout schemes for the electric field shielding layer are described below. As with FIG. 4A, same components are labeled with the same symbols, and other possible components are omitted.

Figure 4B:
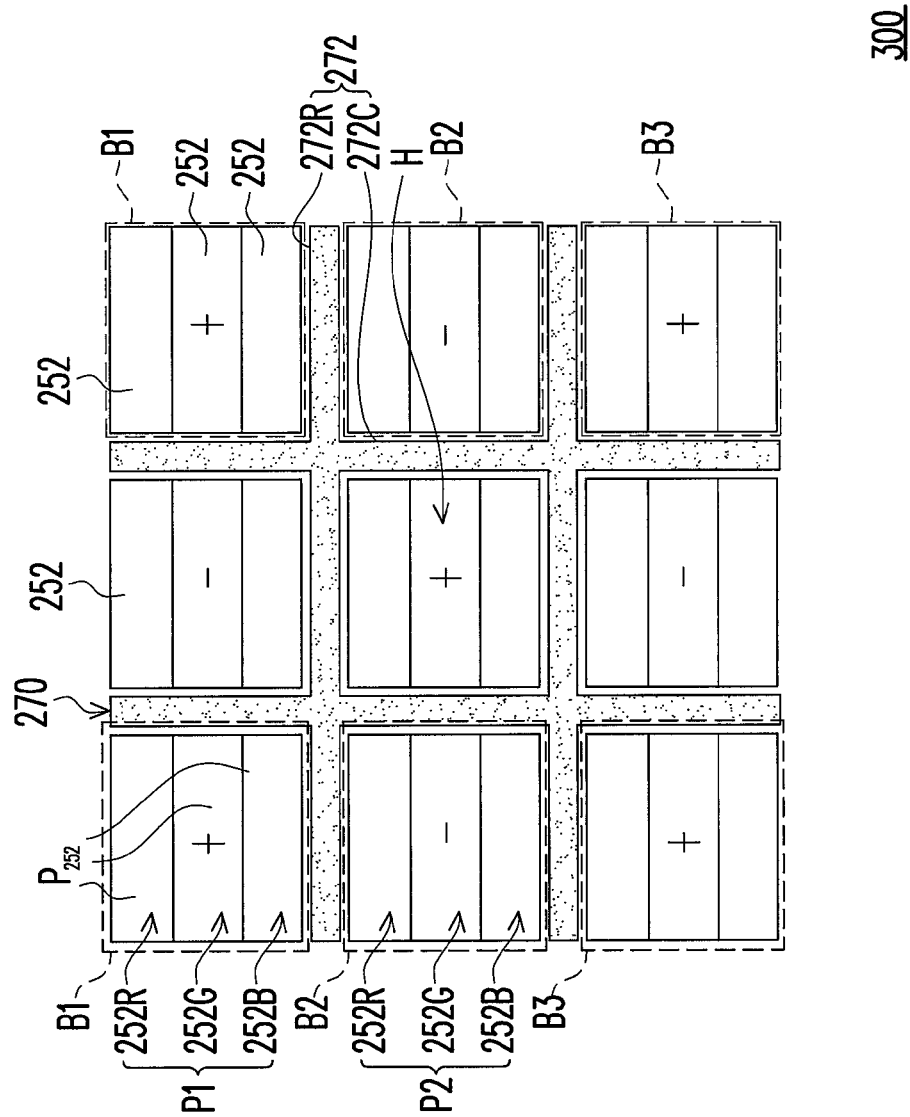
FIG. 4B is a schematic view illustrating a layout of the electric field shielding layer and another signal mode of the touch-sensing LCD panel depicted in FIG. 2B during a frame time.

FIG. 4B is a schematic view illustrating a layout of the electric field shielding layer and another signal mode of the touch-sensing LCD panel depicted in FIG. 2B during a frame time. As shown in FIG. 4B, in the mesh pattern 272 of the touch-sensing LCD panel 300, each of the openings H respectively correspond to a plurality of sub-pixels 252 that are adjacent to each other, wherein the mesh pattern 272 including the above-mentioned row pattern 272R and the above-mentioned column pattern 272C. As shown in FIG. 4B, the electric field shielding layer 270 divides the pixel array 250 into a plurality of regions B1, B2, and B3. In the present embodiment of the invention, each of the regions B1, B2, and B3 respectively includes three sub-pixels 252, and sub-pixels 252 from adjacent regions have a different polarity. In other words, in the present embodiment of the invention as shown in FIG. 4B in the upper-left corner, each of the corresponding sub-pixels 252 to the openings H have the same polarity. A red sub-pixel 252R, a green sub-pixel 252G, and a blue sub-pixel 252B each respectively has a positive polarity, and together the three sub-pixels form a pixel P1 having a positive polarity. As illustrated below the pixel P1, pixel P2 can have a negative polarity that is formed by the red sub-pixel 252R, the green sub-pixel 252G, and the blue sub-pixel 252B, for instance. As shown in FIG. 4B, in the present embodiment of the invention, the mesh pattern 272 is disposed between pixels P1 and P2 adjacent to each other.

Figure 4C:
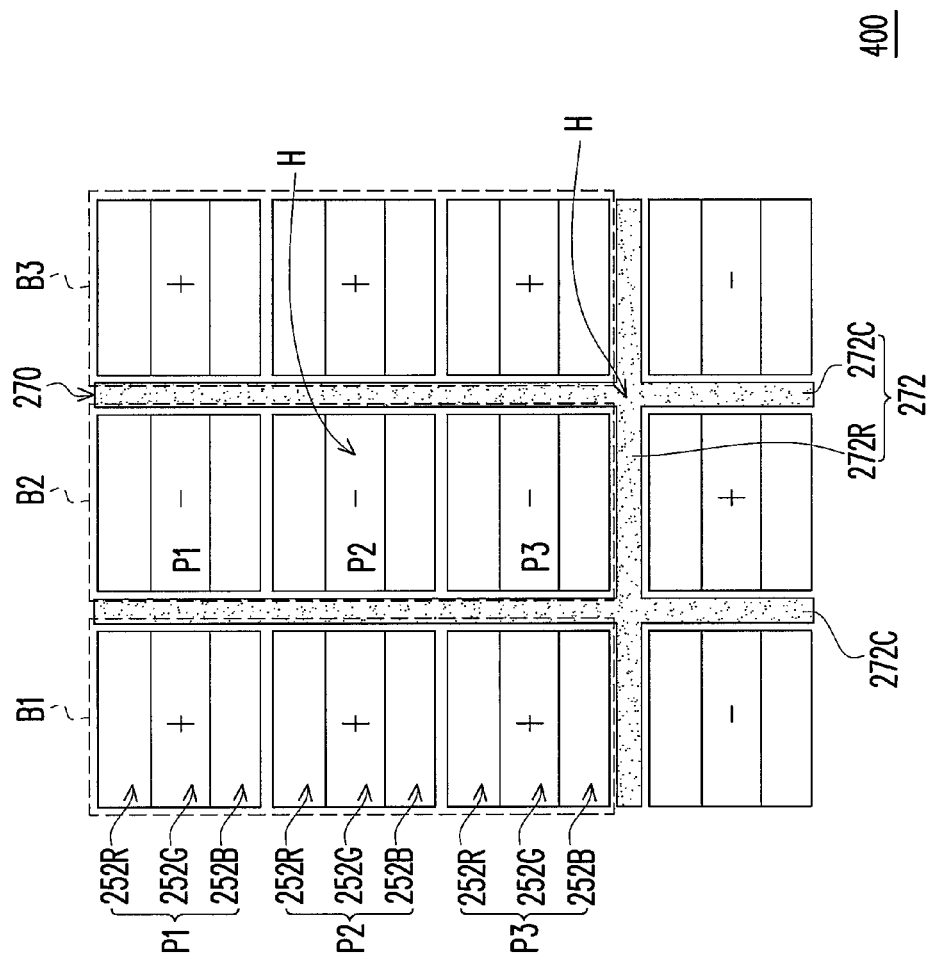
FIG. 4C is a schematic view illustrating a layout of the electric field shielding layer and another signal mode of the touch-sensing LCD panel depicted in FIG. 2B during a frame time.

In another perspective, FIG. 4C is a schematic view illustrating a layout of the electric field shielding layer and another signal mode of the touch-sensing LCD panel depicted in FIG. 2B during a frame time. In the present embodiment of the invention, a three-dot inversion driving scheme is used to drive the touch-sensing LCD panel 400. As shown in FIG. 4C, in the mesh pattern 272 of the touch-sensing LCD panel 400, each of the openings H respectively correspond to a plurality of adjacent pixels 252. Mesh pattern 272 of the electric field shielding layer 270 divides the pixel array 250 into a plurality of regions B1, B2, and B3. In the present embodiment of the invention, each of the regions B1, B2, and B3 respectively includes three pixels P1, P2, and P3. The nine sub-pixels 252 disposed in the same region have the same polarity, and pixels P1, P2, and P3 in adjacent regions have a different polarity. More specifically, in the present embodiment of the invention, each of the openings H of the mesh pattern 272 respectively correspond to three pixels P1, P2, and P3. In FIG. 4C, the three pixels P1, P2, and P3 in the first column respectively have a positive polarity, and sub-pixels 252R, 252G, and 252B of each of the pixels P1, P2, and P3 also have a positive polarity. In the second column of FIG. 4C, pixels P1, P2, P3 have a negative polarity, and sub-pixels 252R, 252G, and 252B disposed within each sub-pixel region also have a negative polarity. As shown in FIG. 4C, in the present embodiment of the invention, the mesh pattern 272 is disposed in a column between two columns of adjacent pixels, and the mesh pattern 272 is disposed in a row spaced by sets of three pixels having a different polarity.

Second Embodiment

Figure 5:
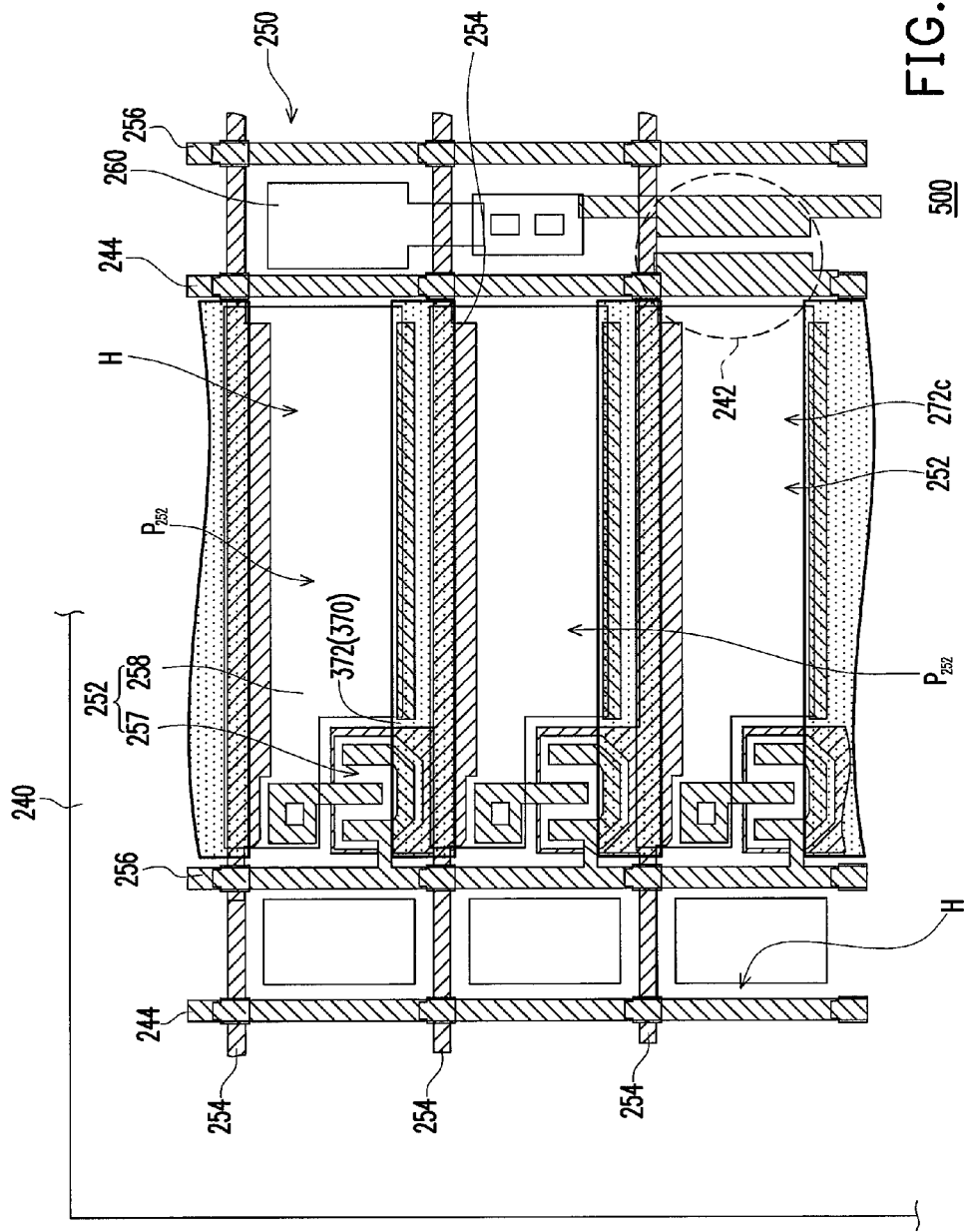
FIG. 5 is a partial magnified cross-sectional schematic view of a touch-sensing LCD panel in accordance with a second embodiment of the present invention.

FIG. 5 is a partial magnified cross-sectional schematic view of a touch-sensing LCD panel in accordance with a second embodiment of the present invention. The touch-sensing LCD panel 500 of the present embodiment of the invention is similar to the aforementioned touch-sensing LCD panel 200. However, in the present embodiment of the invention, the electric field shielding layer 370 in the touch-sensing LCD panel 500 is disposed on the pixel array 250 and arranged between sub-pixels 252 adjacent to each other. A plurality of strip patterns are used to layout the electric field shielding layer 370. More specifically, in the present embodiment of the invention, components similar to the first embodiment are labeled the same. In FIG. 5, only a set of strip patterns is shown for example. A layout of the strip patterns 372 of the electric field shielding layer 370 is detailed below.

Figure 6A:
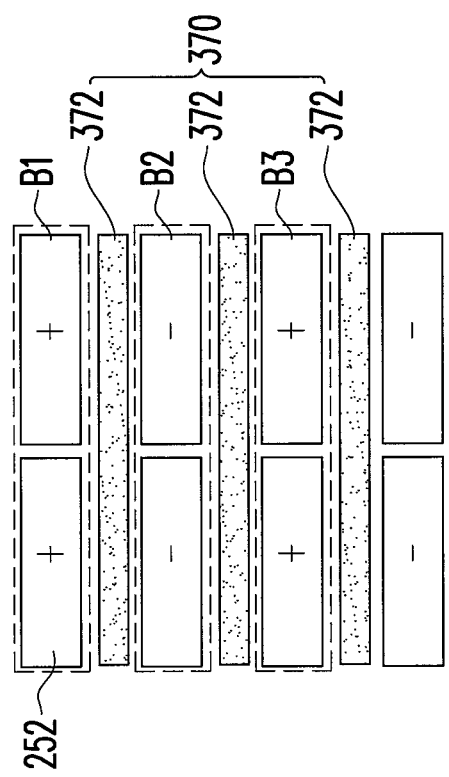
FIG. 6A is a schematic view illustrating a layout of the electric field shielding layer and a signal mode of the touch-sensing LCD panel depicted in FIG. 5 during a frame time.
Figure 6B:
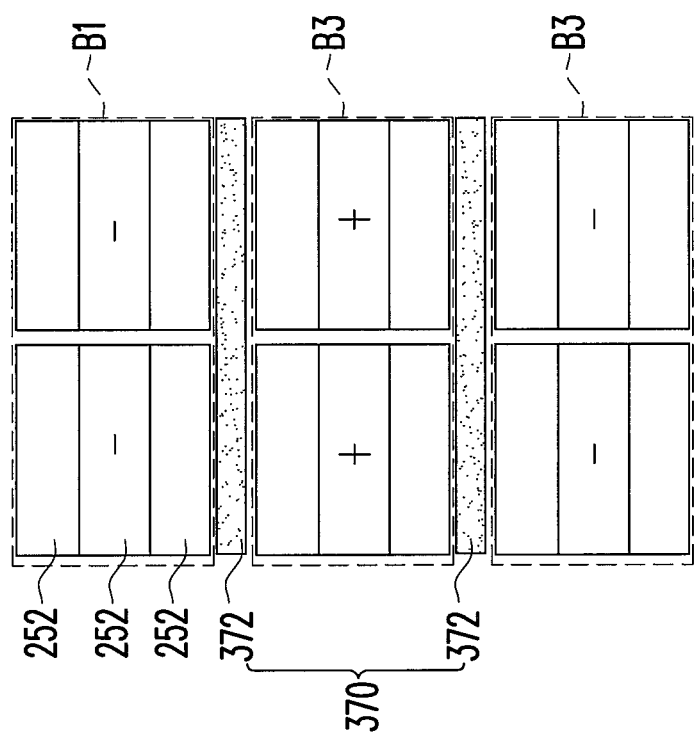
FIG. 6B is a schematic view illustrating a layout of the electric field shielding layer and a signal mode of the touch-sensing LCD panel depicted in FIG. 5 during a frame time.
Figure 6C:
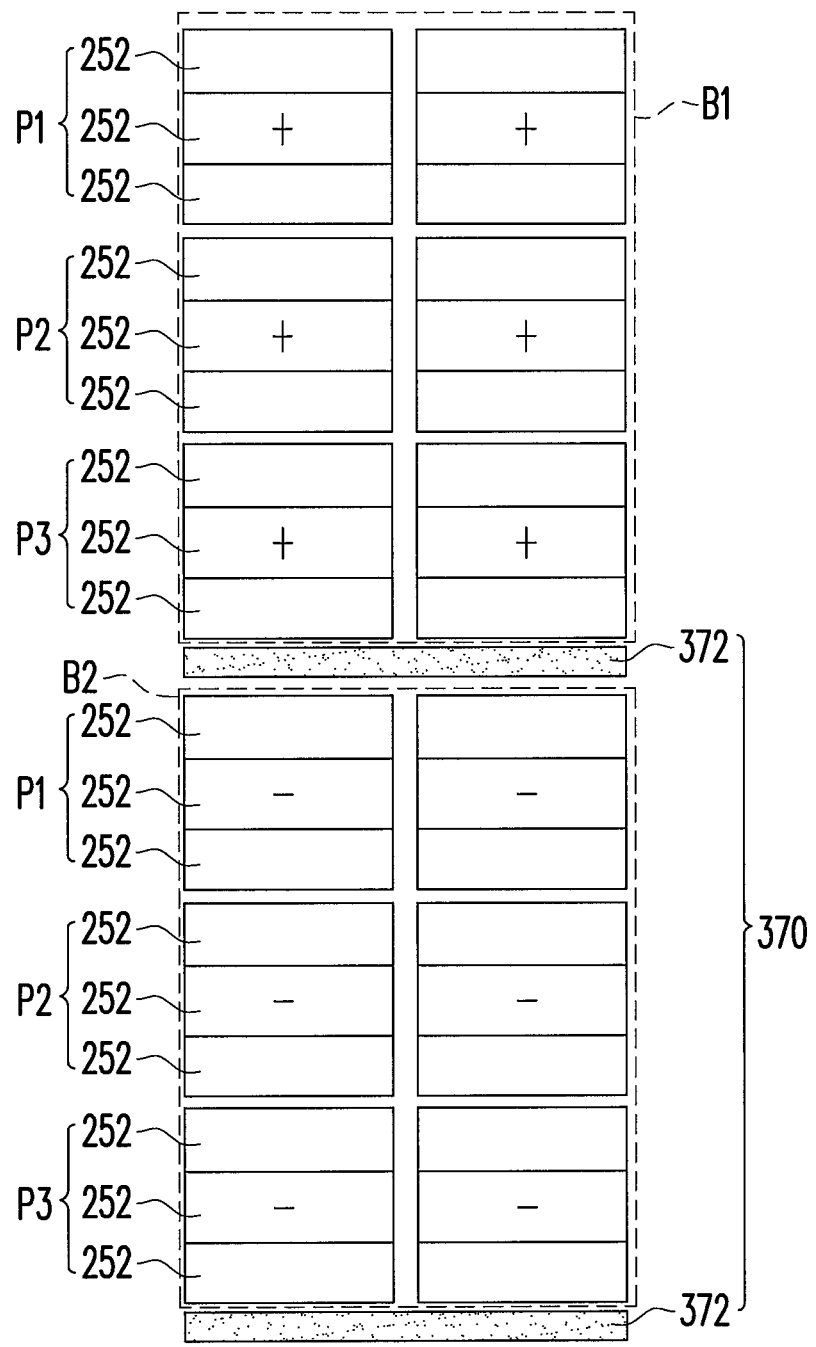
FIG. 6C is a schematic view illustrating a layout of the electric field shielding layer and a signal mode of the touch-sensing LCD panel depicted in FIG. 5 during a frame time.

FIGS. 6A to 6C are schematic views each respectively illustrating a layout of the electric field shielding layer and a signal mode of the touch-sensing LCD panel depicted in FIG. 5 during a frame time. As shown in FIGS. 6A to 6C, in the present embodiment of the invention, the strip patterns 272 are disposed between sub-pixels 252 adjacent to each other. An extending direction of the strip patterns 372 can be arranged parallel to an extending direction of the scan lines 254. In the present embodiment of the invention, an example of the driving scheme used to drive the touch-sensing LCD panel can be row inversion. The strip patterns 372 of the electric field shielding layer 370 are disposed between sub-pixels having a different polarity for each row.

More specifically, as shown in FIG. 6A, in the present embodiment of the invention the electric field shielding layer 370 is disposed between two adjacent rows of sub-pixels 252. The row of sub-pixels 252 disposed between two adjacent strip patterns 372 have the same polarity. Strip patterns 372 of the electric field shielding layer 370 depicted in FIG. 6A divide the pixel array 250 into a plurality of regions B1, B2, and B3. Each of the regions B1, B2, and B3 respectively includes a row of sub-pixels 252. Within each of the regions B1, B2, and B3, the row of sub-pixels 252 have the same polarity, while other rows of sub-pixels 252 in the adjacent regions have a different polarity.

Furthermore, as shown in FIG. 6B, in the present embodiment of the invention, the electric field shielding layer 370 is disposed between two adjacent rows of sub-pixels 252. The row of sub-pixels 252 disposed between two adjacent strip patterns 372 have the same polarity. Strip patterns 372 of the electric field shielding layer 370 depicted in FIG. 6B divide the pixel array 250 into a plurality of regions B1, B2, and B3. Each of the regions B1, B2, and B3 respectively includes three rows of sub-pixels 252. Within each of the regions B1, B2, and B3, the three rows of sub-pixels 252 have the same polarity, while other three rows of sub-pixels 252 in the adjacent regions have a different polarity.

FIG. 6C depicts another possible layout for the electric field shielding layer 370. The strip patterns 372 of the electric field shielding layer 370 divide the pixel array 250 into a plurality of regions B1 and B2. Each of the regions B1 and B2 respectively includes three rows of pixels P1, P2, and P3. Within each of the regions B1 and B2, the nine rows of sub-pixels have, for example, the same polarity, while other three rows of pixels P1, P2, and P3 in the adjacent regions have a different polarity. Therefore, the spirit and the scope of the present invention should not be limited by the layout of the electric field shielding layer 370.

Figure 7A:
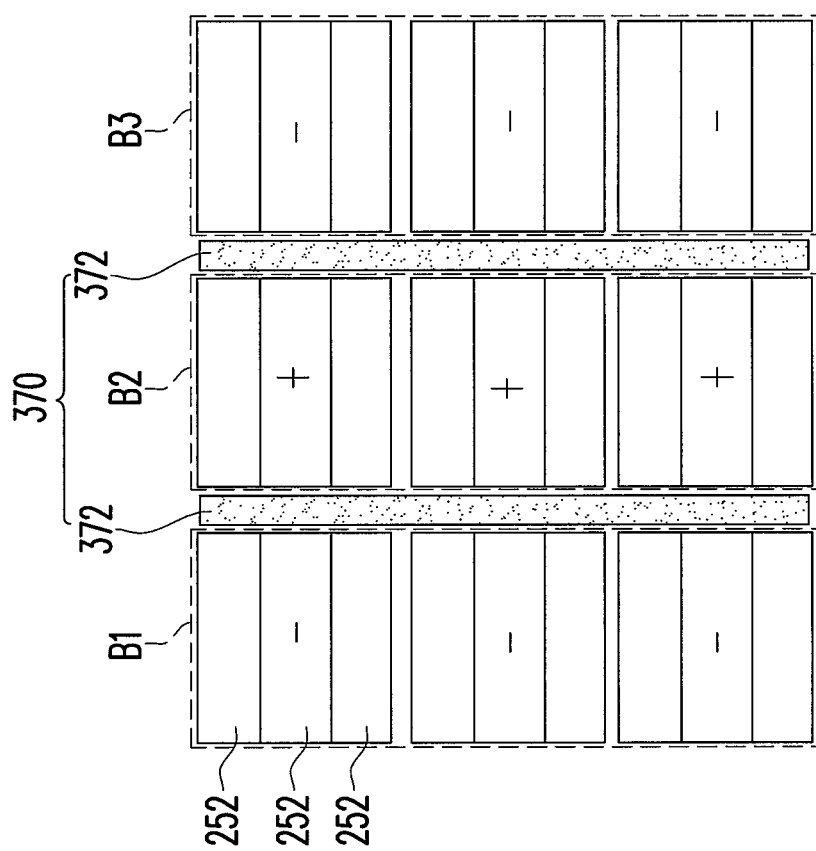
FIG. 7A is a schematic view illustrating a layout of the electric field shielding layer and a signal mode of the touch-sensing LCD panel depicted in FIG. 5 during a frame time.
Figure 7B:
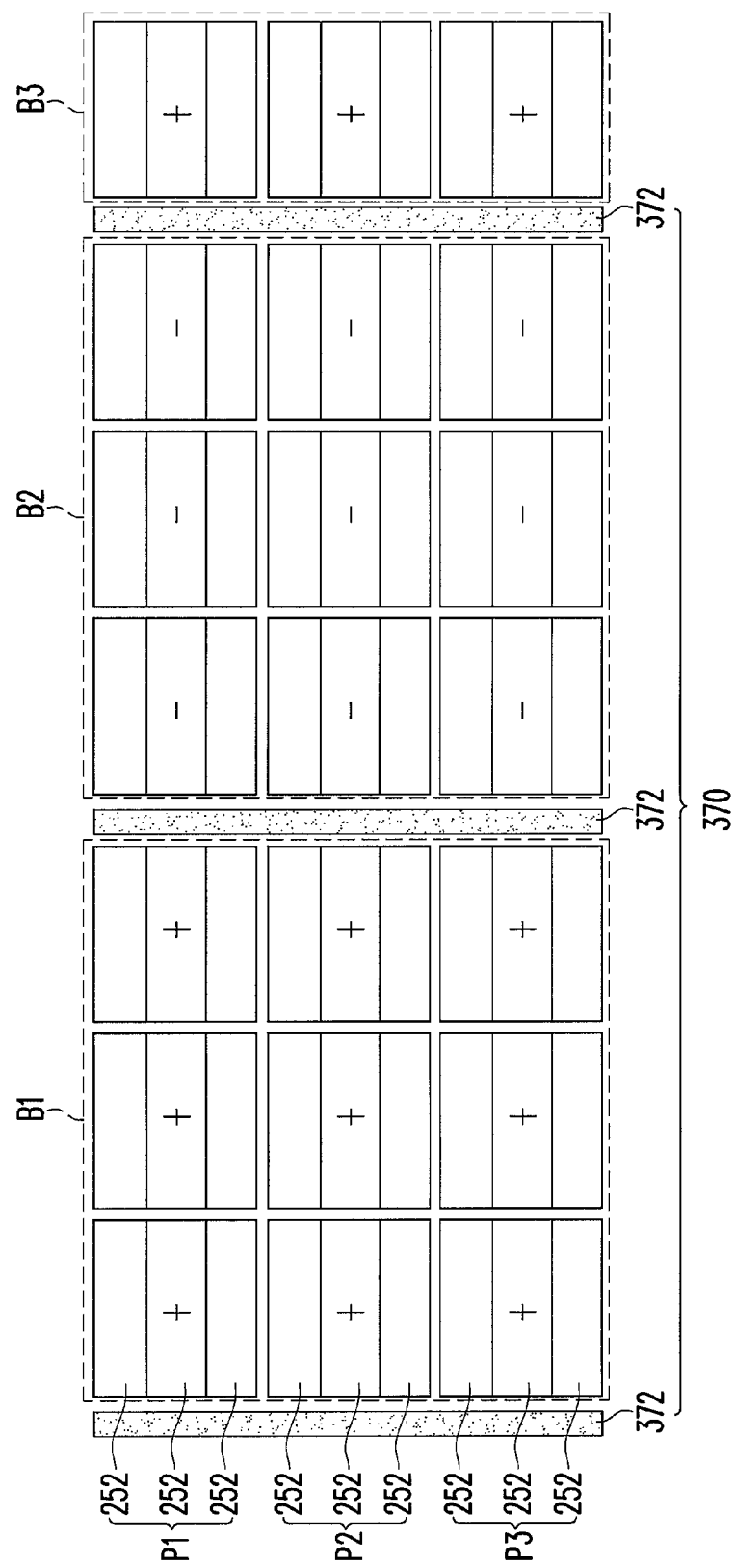
FIG. 7B is a schematic view illustrating a layout of the electric field shielding layer and a signal mode of the touch-sensing LCD panel depicted in FIG. 5 during a frame time.

It should be noted that the strip patterns 372 can be disposed between sub-pixels 252 adjacent to each other, and an extending direction the strip patterns 372 can be arranged parallel to an extending direction of the data lines 256. FIGS. 7A to 7B are schematic views each respectively illustrating a layout of an electric field shielding layer and a signal mode of the touch-sensing LCD panel depicted in FIG. 5 during a frame time. As shown in FIGS. 7A to 7B, in the present embodiment of the invention, the strip patterns 372 are disposed between sub-pixels 252 adjacent to each other, and an extending direction of the strip patterns 372 can be arranged parallel to an extending direction of the data lines 256. An example of a driving scheme used to drive the touch-sensing LCD panel of the present embodiment can be column inversion. Along the column direction, the strip patterns 372 of the electric field shielding layer 370 are disposed between sub-pixels having a different polarity in each column.

Similarly, FIGS. 7A and 7B respectively depicts a plurality of regions of unequal number of sub-pixels 252 which are divided by the strip patterns 372 of the electric field shielding layer 370. Sub-pixels 252 within each of the regions have the same polarity, but sub-pixels 252 within an adjacent region have a different polarity. In short, each of the regions B1, B2, and B3 in FIG. 7A respectively includes a column of sub-pixels 252, while each of the regions B1 and B2 in FIG. 7B respectively includes three columns of sub-pixels 252. Other design considerations can be considered as in the aforementioned embodiment. Therefore, the spirit and the scope of the present invention should not be limited by the layout of the electric field shielding layer 370.

The present invention provides an LCD panel that includes an electric field shielding layer, but does not include a touch-sensing device. Referring to FIGS. 2A and 2B for instance, the LCD panel includes an active device array substrate 210, an opposite substrate 220, and a liquid crystal layer 230. A spacer region 204 and a display region 206 are provided, while the touch-sensing region 202 is not included. In the present embodiment of the invention, as shown in FIG. 2A, the opposite substrate 220 includes a common electrode 222, and the liquid crystal layer 230 is disposed between the active device array substrate 210 and the opposite substrate 220. The active device array substrate 210 includes a first substrate 240, a pixel array 250, and an electric field shielding layer 270. The electric field shielding layer 270 includes a pattern. Description of other details has been aforementioned, so no further details are provided herein. When the LCD panel is pressed by an external pressure, the electric field shielding layer 270 can shield the liquid crystal molecules from the gate electric field effects and the electric field effects between adjacent sub-pixels 252 and the common electrode 222. Consequently, liquid crystal molecules return to their original alignment orientation substantially faster, thereby substantially eliminating press mura on the LCD panel.

In light of the foregoing descriptions, embodiments of the present invention may provide, for a touch-sensing LCD panel and an LCD panel, an electric field shielding layer capable of shielding the electric field effects of sub-pixels adjacent to each other. Consequently, liquid crystal molecules experience substantially lower influence from the electric field effects between the adjacent sub-pixels, so that liquid crystal molecules return substantially faster to their original alignment orientations. Hence, press mura is substantially eliminated from appearing on the touch-sensing LCD panel when pressed by an external pressure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch-sensing LCD panel, comprising:
   an active device array substrate comprising:
   a first substrate;
   a pixel array disposed on the first substrate, wherein the pixel array comprises a plurality of sub-pixels arranged in an array, a plurality of scan lines, and a plurality of data lines, each of the sub-pixels includes an active device and a pixel electrode electrically connected to the active device, and each of the pixel electrodes is overlapped with one of the adjacent scan lines;
   a plurality of touch-sensing pads disposed on the first substrate;
   an electric field shielding layer disposed on the pixel array and arranged between the pixel electrodes of the sub-pixels adjacent to each other for shielding electric fields of the adjacent sub-pixels, wherein the electric field shielding layer is disposed on the edge of the pixel electrode and on the edge of the adjacent pixel electrode, and wherein the electric field shielding layer is overlapping over only a portion of the scan line, wherein the electric field shielding layer includes a mesh pattern and a material for the electric field shielding layer is a dielectric material;

an opposite substrate comprising a common electrode and a plurality of touch-sensing protrusions disposed above the touch-sensing pads; and a liquid crystal layer disposed between the active device array substrate and the opposite substrate.

2. The touch-sensing LCD panel as claimed in claim 1, wherein the scan lines and the data lines are intersected to define a plurality of sub-pixel regions, and each of the sub-pixels is respectively disposed in a sub-pixel region.

3. The touch-sensing LCD panel as claimed in claim 2, wherein the mesh pattern has a plurality of openings, and each of the openings respectively corresponds to one of the sub-pixel regions.

4. The touch-sensing LCD panel as claimed in claim 2, wherein the mesh pattern has a plurality of openings, and each of the openings respectively corresponds to at least two adjacent sub-pixel regions.

5. The touch-sensing LCD panel as claimed in claim 4, wherein the mesh pattern has a plurality of openings, and each of the openings respectively corresponds to the adjacent sub-pixel regions that have the same polarity.

6. The touch-sensing LCD panel as claimed in claim 1, wherein the mesh pattern of the electric shielding layer divides the pixel array into a plurality of regions, wherein each of the regions has at least one sub-pixel, and sub-pixels of adjacent regions have a different polarity from each other.

7. The touch-sensing LCD panel as claimed in claim 1, wherein each of the pixel electrodes is overlapped with one of the adjacent scan lines to form a storage capacitor.

8. A touch-sensing LCD panel, comprising:
an active device array substrate comprising:
a first substrate;
a pixel array disposed on the first substrate, wherein the pixel array comprises a plurality of sub-pixels arranged in an array, a plurality of scan lines, and a plurality of data lines, each of the sub-pixels includes an active device and a pixel electrode electrically connected to the active device, and each of the pixel electrodes is overlapped with one of the adjacent scan lines;
a plurality of touch-sensing pads disposed on the first substrate;
an electric field shielding layer disposed on the pixel array and arranged between the pixel electrodes of sub-pixels that are adjacent to each other for shielding electric fields of the adjacent sub-pixels, wherein the electric field shielding layer is disposed on the edge of the pixel electrode and on the edge of the adjacent pixel electrode, and wherein the electric field shielding layer is overlapping over only a portion of the scan line, wherein the electric field shielding layer has a plurality of strip patterns and a material for the electric field shielding layer is a dielectric material;
an opposite substrate comprising a common electrode and a plurality of touch-sensing protrusions disposed above the touch-sensing pads; and
a liquid crystal layer disposed between the active device array substrate and the opposite substrate.

9. The touch-sensing LCD panel as claimed in claim 8, wherein the scan lines and the data lines are intersected to define a plurality of sub-pixel regions, and each of the sub-pixels is respectively disposed in one of the sub-pixel regions.

10. The touch-sensing LCD panel as claimed in claim 8, wherein an extending direction of the strip patterns is parallel to an extending direction of the scan lines.

11. The touch-sensing LCD panel as claimed in claim 8, wherein an extending direction of the strip patterns is parallel to an extending direction of the data lines.

12. The touch-sensing LCD panel as claimed in claim 8, wherein the sub-pixels disposed between two adjacent strip patterns have the same polarity.

13. The touch-sensing LCD panel as claimed in claim 8, wherein the strip patterns of the electric shielding layer divides the pixel array into a plurality of regions, wherein each of the regions has at least one sub-pixel, and sub-pixels of adjacent regions have a different polarity from each other.

14. The touch-sensing LCD panel as claimed in claim 8, wherein each of the pixel electrodes is overlapped with one of the adjacent scan lines to form a storage capacitor.

15. An LCD panel, comprising:
an active device array substrate comprising:
a first substrate;
a pixel array disposed on the first substrate, wherein the pixel array comprises a plurality of sub-pixels arranged in an array, a plurality of scan lines, and a plurality of data lines, each of the sub-pixels includes an active device and a pixel electrode electrically connected to the active device, and each of the pixel electrodes is overlapped with one of the adjacent scan lines;
an electric field shielding layer disposed on the pixel array and arranged between the pixel electrodes of sub-pixels that are adjacent to each other for shielding electric fields of the adjacent sub-pixels, wherein the electric field shielding layer is disposed on the edge of the pixel electrode and on the edge of the adjacent pixel electrode, and wherein the electric field shielding layer is overlapping over only a portion of the scan line, wherein the electric field shielding layer has a pattern and a material for the electric field shielding layer is a dielectric material;
an opposite substrate comprising a common electrode; and
a liquid crystal layer disposed between the active device array substrate and the opposite substrate.

16. The LCD panel as claimed in claim 15, wherein the scan lines and the data lines are intersected to define a plurality of sub-pixel regions, and each of the sub-pixels is respectively disposed in one of the sub-pixel regions.

17. The LCD panel as claimed in claim 15, wherein the pattern of the electric shielding layer divides the pixel array into a plurality of regions, wherein each of the regions corresponds to at least one sub-pixel, and sub-pixels of adjacent regions have a different polarity from each other.

18. The LCD panel as claimed in claim 15, wherein the pattern of the electric field shielding layer includes a mesh pattern.

19. The LCD panel as claimed in claim 18, wherein the mesh pattern has a plurality of openings, and each of the openings respectively corresponds to at least two adjacent sub-pixel regions that have the same polarity.

20. The LCD panel as claimed in claim 15, wherein the pattern of the electric field shielding layer includes a plurality of strip patterns.

21. The LCD panel as claimed in claim 20, wherein an extending direction of the strip patterns is parallel to an extending direction of the scan lines.

22. The LCD panel as claimed in claim 20, wherein the sub-pixels disposed between two adjacent strip patterns have the same polarity.

23. The LCD panel as claimed in claim 15, further comprising a plurality of touch-sensing pads disposed on the first substrate and a plurality of touch-sensing protrusions disposed above the touch-sensing pads.

24. The LCD panel as claimed in claim 15, wherein each of the pixel electrodes is overlapped with one of the adjacent scan lines to form a storage capacitor.

* * * * *